United States Patent
Zhang et al.

(10) Patent No.: US 11,620,357 B2
(45) Date of Patent: Apr. 4, 2023

(54) GPU-BASED THIRD-ORDER LOW RANK TENSOR CALCULATION METHOD AND APPARATUS

(71) Applicant: Tensor Deep Learning Lab L.L.C., New York, NY (US)

(72) Inventors: Tao Zhang, New York, NY (US); Hai Li, New York, NY (US); Xiaoyang Liu, New York, NY (US)

(73) Assignee: Tensor Deep Learning Lab L.L.C., New York, NY (US)

(*) Notice: Subject to any disclaimer, the term of this patent is extended or adjusted under 35 U.S.C. 154(b) by 698 days.

(21) Appl. No.: 16/715,071

(22) Filed: Dec. 16, 2019

(65) Prior Publication Data
US 2020/0293595 A1    Sep. 17, 2020

(30) Foreign Application Priority Data
Mar. 15, 2019    (CN) .......................... 201910195942.2

(51) Int. Cl.
*G06F 17/14* (2006.01)
*G06F 17/16* (2006.01)
*G06T 1/20* (2006.01)
*G06F 12/06* (2006.01)

(52) U.S. Cl.
CPC .......... *G06F 17/14* (2013.01); *G06F 12/0646* (2013.01); *G06F 17/16* (2013.01); *G06T 1/20* (2013.01); *G06F 2212/1016* (2013.01)

(58) Field of Classification Search
CPC .................................. G06F 17/14; G06F 17/16
See application file for complete search history.

(56) References Cited

U.S. PATENT DOCUMENTS

| 10,635,739 B1* | 4/2020 | Batruni .................. G06N 20/00 |
| 2014/0063077 A1* | 3/2014 | Wetzstein ................ G09G 3/36 345/102 |
| 2021/0125070 A1* | 4/2021 | Wang ...................... G06F 17/16 |

* cited by examiner

*Primary Examiner* — Michael D. Yaary
(74) *Attorney, Agent, or Firm* — GableGotwals

(57) ABSTRACT

The present disclosure provides a GPU-based third-order low-rank tensor calculation method. Operation steps of the method include: transmitting, by a CPU, third-order real value tensor input data DATA1 to a CPU; performing, by the GPU, Fourier transforms on the DATA1, to obtain third-order complex value tensor data DATA2; performing, by the GPU, matrix operations on the DATA2, to obtain third-order complex value tensor data DATA3; performing, by the GPU, inverse Fourier transforms on the DATA3, to obtain third-order real value tensor output data DATA4; and transmitting, by the GPU, the DATA4 to the CPU. In the present disclosure, in the third-order low-rank tensor calculation, a computational task with high concurrent processes is accelerated by using the CPU to improve computational efficiency. Compared with conventional CPU-based third-order low-rank tensor calculation, computational efficiency is significantly improved, and same calculation can be completed by using less time.

6 Claims, 2 Drawing Sheets

GPU-BASED THIRD-ORDER LOW RANK TENSOR CALCULATION METHOD AND APPARATUS

CROSS REFERENCE

This disclosure is based upon and claims priority to Chinese Patent Application No. 201910195942.2 filed on Mar. 15, 2019, titled "GPU-BASED THIRD-ORDER LOW-RANK TENSOR CALCULATION METHOD", and the entire contents of which are incorporated herein by reference.

TECHNICAL FIELD

The present disclosure relates generally to the field of high performance computing and more specifically to a GPU-based (Graphics Processing Unit, GPU) third-order low-rank tensor calculation method and apparatus.

BACKGROUND

High-dimensional data calculation is required in many scientific fields such as big data processing, machine learning, and Internet of Things. Researchers typically model real-world high-dimensional data as low-rank tensors to reduce data redundancy by using the low-rank property. Tensor calculation is a basis of high performance computing and artificial intelligence.

Low-rank tensor models have been widely used in data completion, MRI image processing, two-dimensional dictionary learning, wireless tomographic imaging, and the like. Therefore, researches on high-performance tensor calculation methods are critical for supporting large-scale, high-dimensional, and complex-structural tensor data analysis. However, low-rank tensor operations are computation intensive, and the computation time complexity increases exponentially with the increase of tensor size. Conventional CPU-based tensor calculation takes relatively longer computation time, is inefficient, and cannot meet real-time requirements of real-world applications. Consequently, it is not practical to analyze large-scale tensor data.

A GPU has a large number of computing cores and a high memory access bandwidth, and has been used frequently in recent years to accelerate parallel computing. Powerful computing power of the GPU provides a strong foundation for accelerating tensor calculations.

SUMMARY

To address existing issues in the prior art, the present disclosure provides a third-order low-rank tensor calculation method for the low-tubal-rank tensor model based on GPU. Compared with a conventional CPU-based third-order low-rank tensor calculation, calculation efficiency can be significantly improved, and same calculation can be completed by using less time.

To achieve the above objective, the technical solution of the present disclosure is as follows:

A GPU-based third-order low-rank tensor calculation method includes the following steps:

Step 1: transmitting, by a CPU, third-order real value tensor input data DATA1 to a GPU.

Step 2: performing, by a GPU, Fourier transforms on the DATA1, to obtain third-order complex value tensor data DATA2.

Step 3: performing, by a GPU, matrix operations on the DATA2, to obtain third-order complex value tensor data DATA3.

Step 4: performing, by the GPU, inverse Fourier transforms on the DATA3, to obtain third-order real value tensor output data DATA4.

Step 5: transmitting, by the GPU, the DATA4 to the CPU.

Step 1 includes the following steps:

Step 1.1: allocating memory space in the GPU memory.

Step 1.2: transmitting the third-order real value tensor input data DATA1 in the CPU memory to the allocated memory space in the GPU memory. W denotes the number of third-order tensors in the DATA1, and the value of W is determined by the number of tensors required by a specific tensor operation, and $W \geq 1$.

Step 2 includes the following steps:

Step 2.1: On the GPU, performing Fourier transforms on W third-order real value tensors T of the DATA1 in the GPU memory: H=fft(T, [ ], 3) one by one, to obtain W third-order complex value tensors, wherein $T \in R^{m \times n \times k}$ is a third-order real value tensor, R denotes the set of real values, m, n, and k are respectively sizes of the tensor T in the first, second, and third dimensions. $H \in C^{m \times n \times k}$ is a third-order complex value tensor obtained after Fourier transforms are performed, C denotes the set of complex values, m, n, and k are respectively sizes of the tensor H in the first, second, and third dimensions, and fft(T [ ], 3) denotes Fourier transforms along the third dimension of the tensor T, that is, performing Fourier transforms on m×n pieces of data with length k, and in the case where the GPU memory can meet the space requirement for calculation, these m×n Fourier transforms are carried out in parallel on the GPU.

Step 2.2: saving the W third-order complex value tensors to the GPU memory, to obtain the third-order complex value tensor data DATA2.

Step 3 includes the following steps:

Step 3.1: on the GPU, performing a matrix operation on the W third-order complex value tensors H of the DATA2 in the GPU memory: matrix_op ($H_1$, $H_2$, . . . , $H_w$), to obtain Y third-order tensors, wherein matrix_op ($H_1$, $H_2$, . . . , $H_w$) denotes matrix calculations along frontal slices of the W third-order complex value tensors ($H_1$, $H_2$, . . . , $H_w$), a frontal slice refers to a matrix formed by the first dimension and the second dimension of a tensor, the third-order tensor H with the sizes of m, n, and k respectively in the first, second, and third dimensions has a total of k frontal slices with a size of m rows and n columns, that are denoted as H (:, :, 1), H (:, :, 2), . . . , H(:, :, k), when matrix calculation for matrix_op is performed by extracting a corresponding frontal slice of each tensor for matrix calculation, that is, first extracting H (:, :, 1) of each tensor for matrix calculation, and then extracting H (:, :, 2) of each tensor for matrix calculation, . . . , finally extracting H (:, :, k) of each tensor for matrix calculation, wherein matrix calculation for matrix_op and the value of Y are determined by a specific tensor operation, and $Y \geq 1$, and in the case where the GPU memory can meet the space requirement for calculation, the matrix operations on the W third-order complex value tensors are carried out in parallel on the GPU.

Step 3.2: saving the Y third-order tensors after the matrix operations to the GPU memory, to obtain the third-order complex value tensor data DATA3.

Step 4 includes the following steps:

Step 4.1: on the GPU, performing inverse Fourier transforms on the Y third-order complex value tensors H of the DATA3 in the GPU memory: T=ifft (H, [ ], 3), to obtain Y third-order real value tensors, wherein $H \in C^{m \times n \times k}$ is a third-order complex value tensor, C denotes the set of complex values, m, n, and k are respectively sizes of the tensor H in the first, second, and third dimensions, $T \in R^{m \times n \times k}$ (is a third order real value tensor obtained after inverse Fourier transforms are performed, R denotes the set of real values, m, n, and k are respectively sizes of the tensor T in the first, second, third dimensions, and ifft(H, [ ], 3) denotes inverse Fourier transforms along the third dimension of the tensor H, that is, performing inverse Fourier transforms on m×n pieces of data with length k, and in the case where the GPU memory can meet the space requirement for calculation, these m×n inverse Fourier transforms are carried out in parallel on the GPU.

Step 4.2: saving the Y third-order real value tensors to the GPU memory, to obtain the third-order real value tensor data DATA4.

Step 5 includes the following steps:

Step 5.1: allocating memory space in the CPU memory.

Step 5.2: transmitting the third-order real value tensor output data DATA4 in the GPU memory to the allocated memory space in the CPU memory.

Another objective is to provide an apparatus, comprising a CPU; a GPU, communicably connected with the CPU; a memory communicably connected with the CPU and GPU for storing instructions executable by the CPU and GPU, to perform any of the abovementioned methods.

Compared with the prior art, the present disclosure has the following prominent substantive features and significant technical progresses:

In the present disclosure, in third-order low-rank tensor calculation, a computational task with many concurrent processes is accelerated by using a GPU low-rank to improve computational efficiency. Compared with conventional CPU-based third-order low-rank tensor calculation, computational efficiency is significantly improved, and same calculation can be completed by using less time.

DETAILED DESCRIPTION

To make the objectives, technical solutions, and advantages of the present disclosure clearer, the following further describes the present disclosure in detail with reference to the accompanying drawings and the preferred embodiments. It should be understood that, the specific embodiments described herein are merely intended for explaining the present disclosure, but not for limiting the present disclosure.

Embodiment 1

Figure 2:
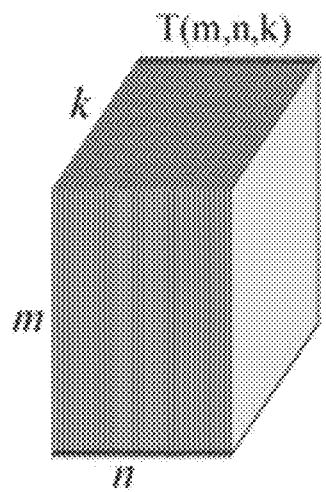
FIG. 2 is a schematic diagram of a third-order tensor.
Figure 3:
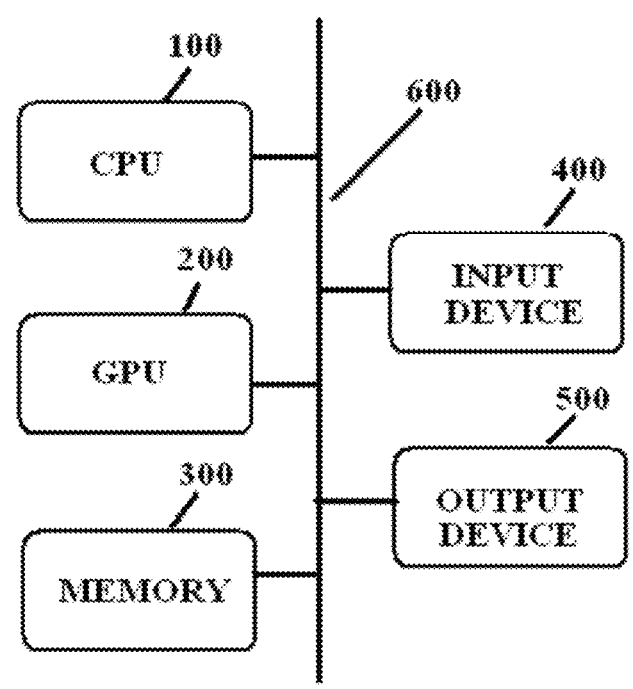
FIG. 3 is a schematic diagram of the apparatus.

A third-order tensor is shown in FIG. 2. A first dimension of the tensor is also referred to as a row, and a size of the row is m, a second dimension is also referred to a column, and a size of the column is n, a size of a third dimension is k. In this way, a real value tensor may be denoted as $T \in R^{m \times n \times k}$, and a complex value tensor may be denoted as $T \in C^{m \times n \times k}$. T(i, j, 1) indicates an element that the first, second, and third dimensions of the tensor T are respectively i, j, l, T(i, j, :) indicates one-dimensional vector formed by k elements: T(i, j, 1), T(i, j, 2), ..., T(i, j, k), and the one-dimensional vector is along the third dimension. T(:, :, 1) indicates the first frontal slice of the tensor T, and the frontal slice is of size m×n, and is a matrix of in rows and columns. The tensor $T \in R^{m \times n \times k}$ has a total of k frontal slices with size m×n.

Figure 1:
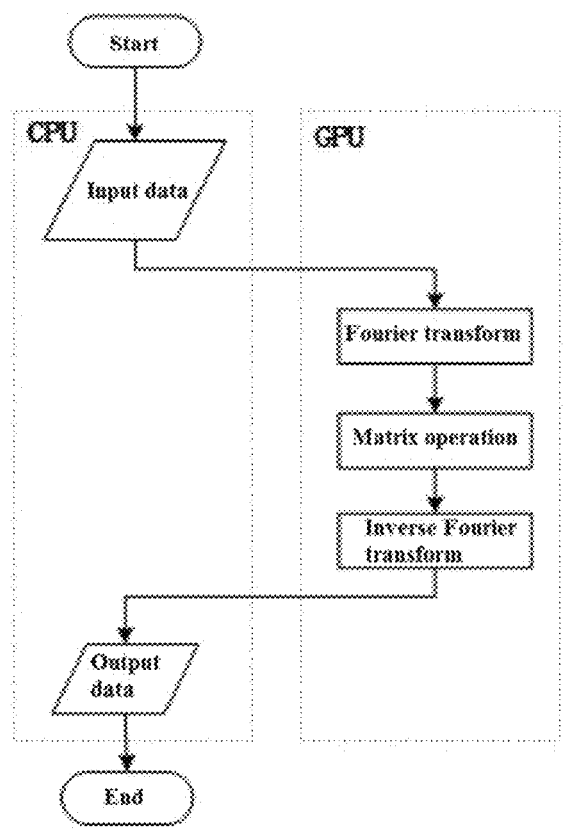
FIG. 1 is a block diagram of a GPU-based third-order low-rank tensor calculation method or the present disclosure.

A GPU-based third-order low-rank tensor calculation method is provided. As shown in FIG. 1, steps are as follows:

Step 1: A CPU transmits third-order real value tensor input data DATA1 to a GPU.

Step 2: The GPU performs Fourier transforms on the DATA1, to obtain, third-order complex value tensor data DATA2.

Step 3: The GPU performs a matrix operation on the DATA2, to obtain third-order complex value tensor data DATA3.

Step 4: The GPU performs inverse Fourier transforms on the DATA3, to obtain third-order real value tensor output data DATA4.

Step 5: The GPU transmits the DATA4 to the CPU.

Embodiment 2: This embodiment is basically the same as Embodiment 1, and special features are as follows:

Step 1 includes the following steps:

Step 1.1: Memory space is allocated in the GPU memory.

Step 1.2: The third-order real value tensor input data DATA1 in the CPU memory is transmitted to the allocated memory space in the GPU memory, wherein W denotes the number of third-order tensors in the DATA1, and the value of W is determined by the number of tensors required by a specific tensor operation, and W≥1. For example, for tensor multiplication, W=2. For singular value decomposition (SVD) of a tensor, W=1.

Step 2 includes the following steps:

Step 2.1: On the GPU, Fourier transforms H=fft(T, [ ], 3) are, performed on W third-order real value tensors T of the DATA1 in the GPU memory one by one, to obtain W third-order complex value tensors, wherein $T \in R^{m \times n \times k}$ is a third-order real value tensor, R denotes the set of real values, m, n, and k are respectively sizes of the tensor in the first, second, and third dimensions, $H \in R^{m \times n \times k}$ is a third-order complex value tensor obtained after Fourier transforms are performed, C denotes the set of complex values, m, n, and k are respectively sizes of the tensor H in the first, second, and third dimensions, and fft(T [ ], 3) denotes performing Fourier transforms along the third dimension of the tensor T, that is, performing Fourier transforms on m×n pieces of data with length k; and in the case where the GPU memory can meet the space requirement for calculation, m×n Fourier transforms are carried out in parallel on the GPU.

Step 2.2: The W third-order complex value tensors are saved to the GPU memory, to obtain the third-order complex value tensor data DATA2.

Step 3 includes the following steps:

Step 3.1: On the GPU, matrix operations are performed on the W third-order complex value tensors H of the DATA2 in the GPU memory: matrix_op (H1, H2, ..., Hw), to obtain Y third-order tensors, wherein matrix_op ($H_1, H_2, ..., H_w$) denotes performing, calculation along frontal slices of the W third-order complex value tensors ($H_1, H_2, ..., H_w$), a frontal slice refers to a matrix formed along the first dimension and the second dimension of a tensor, the third-order tensor H with the sizes of in, n, and k respectively in the first, second, and third dimensions has a total of k frontal slices with a size of m rows and n columns, that are denoted as H (:, :, 1), H (:, :, 2), ..., H(:, :, k), when calculation for matrix_op is performed by extracting a corresponding frontal slice of each tensor for calculation, that is, first extracting H (:, :, 1) of each tensor for matrix calculation, and then extracting H (:, :, 2) of each tensor for matrix calculation, . . . , finally extracting H (:, :, k) of each tensor for matrix calculation, wherein matrix calculation for matrix_op and the value of Y are determined by the specific tensor operation, and Y≥1. For example, for tensor multiplication, the matrix operation to be performed for matrix_op is matrix multiplication, and V=W/2. For tensor singular value decomposition, the matrix operation to be performed for matrix_op is matrix singular value decomposition, and Y=W*3. In the case where the GPU memory can meet the space requirement for calculation, the matrix operations on the W third-order complex value tensors, are carried out in parallel on the GPU.

Step 3.2: The Y third-order tensors after the matrix operation are saved to the GPU memory, to obtain the third-order complex value tensor data DATA3.

Step 4 includes the following steps:

Step 4.1: On the GPU, inverse Fourier transforms are performed on the Y third-order complex value tensors H of the DATA3 in the GPU memory: T=ifft (H, [ ], 3), to obtain Y third-order real value tensors, wherein H∈$C^{m \times n \times k}$ is a third-order in complex value tensor, C denotes the set of complex, values, m n, and k are respectively sizes of the tensor H in the first, second, and third dimensions, T∈$R^{m \times n \times k}$ is a third-order real value tensor obtained after inverse Fourier transforms are performed, R denotes the set of real values, m, n, and k are respectively sizes of the tensor T in the first, second, third dimensions, and ifft(H, [ ], 3) denotes performing inverse Fourier transforms along the third dimension of the tensor H, that is, performing inverse Fourier transforms on m×n pieces of data with length k, and in the case where the GPU memory can meet the space requirement for calculation, m×n inverse Fourier transforms are carried out in parallel on the GPU.

Step 4.2: The Y third-order real value tensors are saved to the GPU memory, to obtain the third-order real value tensor data DATA4.

Step 5 includes the following steps:

Step 5.1: Space is allocated in the CPU memory.

Step 5.2: The third-order real value tensor output data DATA4 in the GPU memory is transmitted to the allocated memory space in the CPU memory.

The disclosure further provides an apparatus, comprising a CPU 100; a GPU 200, communicably connected with the CPU 100; a memory 300 communicably connected with the CPU 100 and GPU 200 for storing instructions executable by the CPU 100 and GPU 200, to perform any of the abovementioned

What is claimed is:

1. A apparatus comprising:
   a CPU;
   a GPU, communicably connected with the CPU;
   non-transitory machine readable storage medium containing stored instructions;
   a memory communicably connected with the CPU and GPU for storing instructions executable by the CPU and GPU, the instructions when executed perform the steps of
   Step 1, allocating memory space in the CPU memory for receiving third-order real value tensor input DATA1 corresponding to a higher dimensional data model;
   Step 2, receiving the third-order real value tensor input DATA1 in the allocated memory space in the CPU memory;
   Step 3, allocating memory space in the GPU memory for receiving the third-order real value tensor DATA1;
   Step 4, transmitting the third-order real value tensor input data DATA1 to the allocated memory space in GPU memory;
   Step 5, performing in the GPU:
      Step 6, Fourier transforms on the third-order real value tensor input data DATA1 to obtain third-order complex value tensor data DATA2;
      Step 7, a matrix operation on the third-order complex value tensor data DATA2 to obtain third-order complex value tensor data DATA3;
      Step 8, Fourier transforms on the third-order complex value tensor data DATA3 to obtain third-order real value tensor output data DATA4; and
   Step 9, allocating memory space in the CPU memory for receiving the third-order real value tensor DATA4;
   Step 10, transmitting the third-order real value tensor output data DATA4 to the allocated memory space of Step 9 in the CPU memory; and
   Step 11, outputting the third-order real value tensor output data DATA4 from the CPU;
   wherein the third-order real value tensor output data DATA4 has a lower rank property than the higher dimensional data model.

2. Non-transitory machine readable storage medium containing stored instructions thereon, that when executed by a processor, perform steps comprising:
   Step 1, allocating memory space in the CPU memory for receiving third-order real value tensor input DATA1 corresponding to a higher dimensional data model;
   Step 2, receiving the third-order real value tensor input DATA1 in the allocated memory space in the CPU memory;
   Step 3, allocating memory space in the GPU memory for receiving the third-order real value tensor DATA1;
   Step 4, transmitting the third-order real value tensor input data DATA1 to the allocated memory space in GPU memory;
   Step 5, performing in the GPU:
      Step 6, Fourier transforms on the third-order real value tensor input data DATA1 to obtain third-order complex value tensor data DATA2;
      Step 7, a matrix operation on the third-order complex value tensor data DATA2 to obtain third-order complex value tensor data DATA3;
      Step 8, Fourier transforms on the third-order complex value tensor data DATA3 to obtain third-order real value tensor output data DATA4; and
   Step 9, allocating memory space in the CPU memory for receiving the third-order real value tensor DATA4;
   Step 10, transmitting the third-order real value tensor output data DATA4 to the allocated memory space of Step 9 in the CPU memory; and
   Step 11, outputting the third-order real value tensor output data DATA4 from the CPU;
   wherein the third-order real value tensor output data DATA4 has a lower rank property than the higher dimensional data model.

3. The instructions of claim 2, wherein
   the Step 4 transmitting the third-order real value tensor input data DATA1 in the allocated memory space of Step 1 in the CPU memory to the allocated memory space of Step 3 in the GPU memory, wherein W indicates the number of third-order tensors in the third-order real value tensor input data DATA1, and the value of W is determined by the number of input tensors required for a specific tensor operation, and W≥1.

4. The instructions of claim 2, wherein detailed operation steps of Step 6 comprise:

Step 6.1: on the GPU, performing Fourier transforms on W third-order real value tensors T of the third-order real value tensor input data DATA1 in the GPU memory: H=fft(T, [ ], 3) one by one, to obtain W third-order complex value tensors, wherein $T \in R^{m \times n \times k}$ is a third-order real value tensor, R denotes the set of real values, m, n, and k are respectively sizes of the tensor T in the first, second, and third dimensions; $T \in C^{m \times n \times k}$ is a third-order complex value tensor obtained after Fourier transforms are performed, C denotes the set of complex values, m, n, and k are respectively sizes of the tensor H in the first, second and third dimensions, and fft(T, [ ], 3) denotes Fourier transforms along the third dimension of the tensor T, that is, performing Fourier transforms on m×n pieces of data with length k; and in the case where the GPU memory can meet the space requirement for calculation, m×n Fourier transforms are carried out in parallel on the GPU; and Step 6.2: saving the W third-order complex value tensors to the GPU memory, to obtain the third-order complex value tensor data DATA2.

5. The instructions of claim 2, wherein detailed operations steps of Step 7 comprise:

Step 7.1: on the GPU, performing matrix operations on W third-order complex value tensors H of the third-order complex value tensor data DATA2 in the GPU memory: matrix_op ($H_1$, $H_2$, . . . , $H_w$) to obtain Y third-order tensors, wherein matrix_op $H_1$, $H_2$, . . . , $H_w$) denotes performing calculation along frontal slices of the W third-order complex value tensors ($H_1$, $H_2$, . . . , $H_w$), a frontal slice refers to a matrix formed along the first dimension and the second dimension of a tensor, the third-order tensor H with the sizes of m, n, and k respectively in the first, second and third dimensions has a total of k frontal slices with a size of m rows and n columns, that are denoted as H (:, :, 1), H(:, :, 2), . . . , H(:, :, k); when calculation for matrix_op is performed by extracting a corresponding frontal slice of each tensor for calculation, that is, first extracting H (:, :, 1) of each tensor for matrix calculation, and then extracting H (:, :, 2) of each tensor for matrix calculation, . . . , finally extracting H (:, :, k) of each tensor for matrix calculation, wherein matrix calculation for matrix_op and the value of Y are determined by the specific tensor operation, and Y≥; and in the case where the GPU memory can meet the space requirement for calculation, the matrix operations on the W third-order complex tensors are carried out in parallel on the GPU; and Step 7.2 saving the Y third-order tensors after the matrix operation to the GPU memory, to obtain the third-order complex value tensor data DATA3.

6. The instructions of claim 2, wherein detailed operation steps of Step 8 comprise:

Step 8.1: on the GPU, performing inverse Fourier transforms on Y third-order complex value tensors H of the third-order complex value tensor data DATA3 in the GPU memory: T=ifft (H, [ ], 3), to obtain Y third-order real value tensors, wherein $H \in C^{m \times n \times k}$ is a third-order complex value tensor, C denotes the set of complex values, m, n, and k are respectively sizes of the tensor H in the first dimension, second dimension, and third dimensions, $T \in R^{m \times n \times k}$ is a third-order real value tensor obtained after inverse Fourier transforms are performed, R denotes the set of real values, m, n, and k are respectively sizes of the tensor T in the first, second, third dimensions, and the ifft(H, [ ], 3) denotes performing inverse Fourier transforms along the third dimension of the tensor H, that is, performing inverse Fourier transforms on m×n pieces of data with length k; and in the case where the GPU memory can meet the space requirement for calculation, m×n inverse Fourier transforms are carried out in parallel on the GPU; and Step 8.2: saving the Y third-order real value tensor to the GPU memory, to obtain the third-order real value tensor data DATA4.

* * * * *